United States Patent
Janik et al.

(10) Patent No.: US 9,274,576 B2
(45) Date of Patent: Mar. 1, 2016

(54) SYSTEM AND METHOD FOR ACTIVATION OF PORTABLE AND MOBILE MEDIA PLAYER DEVICES FOR WIRELESS LAN SERVICES

(75) Inventors: Craig M. Janik, Los Altos Hills, CA (US); Nicholas Kalayjian, Burlingame, CA (US)

(73) Assignee: Callahan Cellular L.L.C., Wilmington, DE (US)

( * ) Notice: Subject to any disclaimer, the term of this patent is extended or adjusted under 35 U.S.C. 154(b) by 81 days.

(21) Appl. No.: 10/802,518

(22) Filed: Mar. 16, 2004

(65) Prior Publication Data

US 2004/0242224 A1 Dec. 2, 2004

Related U.S. Application Data

(60) Provisional application No. 60/455,179, filed on Mar. 17, 2003, provisional application No. 60/472,253, filed on May 21, 2003.

(51) Int. Cl.

| G06F 1/32 | (2006.01) |
|---|---|
| G06F 1/26 | (2006.01) |
| G08C 17/02 | (2006.01) |

(Continued)

(52) U.S. Cl.
CPC .............. *G06F 1/263* (2013.01); *G06F 1/3203* (2013.01); *G08C 17/02* (2013.01); *G11B 27/10* (2013.01); *G11B 27/34* (2013.01); *G11B 27/36* (2013.01); *H04N 21/41407* (2013.01);
(Continued)

(58) Field of Classification Search
CPC ....... G06F 1/263; G06F 1/3203; G08C 17/02; G11B 27/10; G11B 27/34; G11B 27/36; H04N 21/41407; H04N 21/41422; H04N 21/43637; H04L 67/1095
USPC .................. 455/3.01, 3.03, 3.04, 41.2, 412.1, 455/414.1, 574, 73, 78, 88, 343.5; 370/350, 370/503
See application file for complete search history.

(56) References Cited

U.S. PATENT DOCUMENTS

| 4,955,038 A | 9/1990 | Lee et al. |
|---|---|---|
| 5,175,845 A | 12/1992 | Little |

(Continued)

FOREIGN PATENT DOCUMENTS

| EP | 0 502 566 | 9/1992 |
|---|---|---|
| EP | 0992921 A2 | 4/2000 |

(Continued)

OTHER PUBLICATIONS

Haartsen, J.C.; Mattisson, S.; Proceedings of the IEEE vol. 88, Issue 10, Oct. 2000 pp. 1651-1661.*

(Continued)

*Primary Examiner* — Raymond Dean

(57) ABSTRACT

A system and a method for activation of portable and mobile media player devices for wireless LAN services have been disclosed. In one embodiment, the system includes a server computer, a wireless transmitter to transmit a signal, and a portable device comprising a wireless receiver to receive the signal and a wireless transceiver to transition from a first state to a second state to perform content synchronization with the server computer in response to the signal, wherein the wireless transceiver consumes less power in the first state than in the second state. Other embodiments have been claimed and described.

26 Claims, 13 Drawing Sheets

(51) Int. Cl.
*G11B 27/10* (2006.01)
*G11B 27/34* (2006.01)
*G11B 27/36* (2006.01)
*H04N 21/414* (2011.01)
*H04N 21/4363* (2011.01)
*H04L 29/08* (2006.01)

(52) U.S. Cl.
CPC .. *H04N 21/41422* (2013.01); *H04N 21/43637* (2013.01); *H04L 67/1095* (2013.01)

(56) References Cited

U.S. PATENT DOCUMENTS

| | | | |
|---|---|---|---|
| 5,434,860 | A | 7/1995 | Riddle |
| 5,721,827 | A | 2/1998 | Logan et al. |
| 5,724,567 | A | 3/1998 | Rose et al. |
| 5,742,599 | A | 4/1998 | Lin et al. |
| 5,758,257 | A | 5/1998 | Herz et al. |
| 5,790,935 | A | 8/1998 | Payton |
| 5,793,980 | A | 8/1998 | Glaser et al. |
| 5,812,942 | A * | 9/1998 | Allen et al. .............. 455/139 |
| 5,884,028 | A | 3/1999 | Kindell et al. |
| 5,926,624 | A | 7/1999 | Katz et al. |
| 5,991,306 | A | 11/1999 | Burns et al. |
| 6,005,566 | A | 12/1999 | Jones et al. |
| 6,037,675 | A | 3/2000 | Yoshida et al. |
| 6,169,387 | B1 | 1/2001 | Kaib |
| 6,263,491 | B1 * | 7/2001 | Hunt ........................ 717/130 |
| 6,263,503 | B1 | 7/2001 | Margulis |
| 6,433,515 | B2 | 8/2002 | Sakakibara |
| 6,434,747 | B1 | 8/2002 | Khoo et al. |
| 6,453,355 | B1 | 9/2002 | Jones et al. |
| 6,526,581 | B1 | 2/2003 | Edson |
| 6,678,215 | B1 | 1/2004 | Treyz et al. |
| 6,678,737 | B1 | 1/2004 | Bucher |
| 6,700,893 | B1 | 3/2004 | Radha et al. |
| 6,708,213 | B1 | 3/2004 | Bommaiah et al. |
| 6,717,952 | B2 | 4/2004 | Jones et al. |
| 6,744,698 | B2 | 6/2004 | Koyama et al. |
| 6,744,763 | B1 | 6/2004 | Jones et al. |
| 6,794,849 | B2 | 9/2004 | Mori et al. |
| 6,826,283 | B1 | 11/2004 | Wheeler et al. |
| 6,829,648 | B1 | 12/2004 | Jones et al. |
| 6,834,195 | B2 | 12/2004 | Brandenberg et al. |
| 6,940,833 | B2 * | 9/2005 | Jonas et al. ................ 370/329 |
| 6,993,587 | B1 * | 1/2006 | Basani et al. ............. 709/229 |
| 7,072,697 | B2 * | 7/2006 | Lappetelainen et al. ...... 455/574 |
| 7,117,516 | B2 | 10/2006 | Khoo et al. |
| 7,191,242 | B1 | 3/2007 | Serenyi et al. |
| 7,245,649 | B2 * | 7/2007 | Haartsen .................. 375/132 |
| 7,366,788 | B2 | 4/2008 | Jones et al. |
| 2002/0056112 | A1 | 5/2002 | Dureau et al. |
| 2002/0065564 | A1 * | 5/2002 | Sheriff et al. .............. 700/11 |
| 2002/0066018 | A1 * | 5/2002 | Linnartz .................... 713/171 |
| 2002/0137460 | A1 * | 9/2002 | Sun et al. .................. 455/41 |
| 2002/0164973 | A1 | 11/2002 | Janik et al. |
| 2003/0050058 | A1 * | 3/2003 | Walsh et al. .............. 455/426 |
| 2003/0197607 | A1 * | 10/2003 | Striemer .................. 340/539.1 |
| 2004/0029621 | A1 * | 2/2004 | Karaoguz et al. ............ 455/574 |
| 2004/0152450 | A1 * | 8/2004 | Kouznetsov et al. ...... 455/412.1 |
| 2004/0242224 | A1 | 12/2004 | Janik et al. |
| 2005/0258806 | A1 | 11/2005 | Janik et al. |

FOREIGN PATENT DOCUMENTS

| | | | |
|---|---|---|---|
| EP | 1025738 B1 | 8/2000 | |
| EP | 1357704 A2 | 10/2003 | |
| EP | 0909112 B1 | 1/2004 | |
| WO | 9918506 A1 | 4/1999 | |
| WO | 0023899 A1 | 4/2000 | |
| WO | 0049731 A1 | 8/2000 | |
| WO | 0110124 A1 | 2/2001 | |
| WO | 0147192 A1 | 6/2001 | |
| WO | WO 01/45064 A1 | 6/2001 | |

OTHER PUBLICATIONS

Bluetooth—a new low-power radio interface providing short-range connectivity Haartsen, J.C.; Mattisson, S.; Proceedings of the IEEE vol. 88, Issue 10, Oct. 2000 pp. 1651-1661.*
Afonso, A.P. et al., "Dynamic Data Delivery to Mobile Users", Department of Information, Science Faculty of the University of Lisboa, 1999, pp. 121-126.
Chunlong Guo et al., "Low Power Distributed MAC for Ad Hoc Sensor Radio Networks", Berkeley Wireless Research Center, Dept. of EECS, University of California at Berkeley, 2001, pp. 2944-2948.
PR Newswire, New Company Xenote Allows Consumers to 'Bookmark the Real World' with Fun, Personal Internet Device, Jan. 25, 2000, 2pgs.
G. Degoulet et al., EPEOS—Automatic Program Recording System, Nov. 1975, 22 pgs.
Tivo, Inc., Form S-1, Jul. 22, 1999, 902 pgs.
EPO Communication for Application No. 04 757 592.3 dated Mar. 26, 2009.
International Search Report and Written Opinion for PCT/US04/08243 mailed Dec. 16, 2005.
International Preliminary Report on Patentability for PCT/US04/08243 completed May 23, 2007.
International Preliminary Report on Patentability PCT/US2006/006079 dated Mar. 10, 2009.
International Search Report and Written Opinion for PCT/US06/06079 mailed Dec. 21, 2007.
EPO Communication for Application No. 04 757 592.3 dated Mar. 1, 2007.
Supplementary European Search Report for Application No. 04 757 592.3 dated May 4, 2006.
EPO Communication for Application No. 04 757 592.3, dated Oct. 16, 2007.
First Office Action issued by Chinese Patent Office for CN 200480007433.4 (with English translation), issued Jul. 17, 2009.
Office Action for U.S. Appl. No. 11/069,138, mailed Jul. 9, 2009.
Notice of Allowance for U.S. Appl. No. 11/069,138, mailed Jan. 7, 2010.
EPO Communication for EP Appl. 04757592.3, dated Jul. 22, 2010.
Notice of Allowance on U.S. Appl. No. 12/367,657, mailed Apr. 1, 2010.
Extended European Search Report issued on EP Application 06735647.7, dated Apr. 19, 2012.
Fei et al., "An Energy-aware Framework for Coordinated Dynamic Software Management in Mobile Computers," Proceedings of the IEEE Computer Society's 12th International Symposium on MASCOTS'04, Oct. 4, 2004, 12 pages.
Pasco et al., "A unified discharge voltage characteristic for VRLA battery capacity and reserve time estimation," Energy Conversion and Management, vol. 45, No. 2, Jan. 1, 2004, pp. 277-302.
Ross et al., "Development of a Battery Runtime Prediction Algorithm and a Method for Determining its Accuracy," IEEE Telecommunications Energy Conference, Oct. 29, 1995, pp. 277-283.
Stolitzka et al., "When is It Intelligent to Use a Smart Battery?", Proceedings of the Ninth Annual IEEE, Jan. 11, 1994, pp. 173-178.
Microchip Technology Inc.: PICmicro Mid Range MCU Family Reference Manual, Section 26. Watchdog Timer and Sleep Mode, pp. 26-1 to 26-12, 1997.
Summons to Attend Oral Proceedings for EP Application 04757592.3 mailed Mar. 28, 2014.

* cited by examiner

SYSTEM AND METHOD FOR ACTIVATION OF PORTABLE AND MOBILE MEDIA PLAYER DEVICES FOR WIRELESS LAN SERVICES

This application claims the benefit of U.S. Provisional Application No. 60/455,179, filed Mar. 17, 2003, entitled System and Method for Wakeup of Automotive Computer System for Wireless LAN Services; and No. 60/472,253, filed May 20, 2003, entitled System and Method for Wakeup of Automotive Computer System for Wireless LAN Services with Key Fob Actuation.

FIELD OF THE INVENTION

This invention relates to the field of wireless synchronization of content onto portable and mobile automotive media storage and playback devices.

BACKGROUND OF THE INVENTION

Proliferation of high-speed wireless local area network (WLAN) access points combined with the availability of a wide variety of digital file-based content provides the opportunity for users to receive this content wirelessly at WLAN enabled media playback devices. These devices include portable devices specifically purposed for media playback such as portable MP3 or MPEG video players, Personal Digital Assistants (PDAs), laptop computers, GPS devices, and mobile automotive installed media players. Portable and mobile automotive media playback devices use either flash memory or hard disk drives to store the file-based content, and are battery powered. The file-based digital media available for transfer to portable or mobile automotive players includes for example navigation information (maps and street addresses) to be used in conjunction with GPS receivers, and entertainment content including audio (MP3, .wav, or other formats) and video (MPEG-2, MPEG-4, etc.) files.

Currently, media playback devices such as those listed above typically receive new content when a user couples and activates such devices to a source of new content, such as a personal computer (PC). For example, the iPod®, provided by Apple Computer, Inc. of Cupertino, Calif., receives new digital audio files via a USB 2.0 connection to a Macintosh or Windows PC. The user may couple the iPod to the computer and activates synchronization using iTunes® media management software. Typically, the user activates the synchronization after they have manually acquired new audio content, either by purchasing the content from an online service or by encoding audio tracks from an audio Compact Disc (CD).

One convenient system for transferring content to portable or mobile automotive player devices is to attach wireless LAN transceivers to the portable devices and execute synchronization automatically when the portable device is in range of the WLAN and when new content is available at a server coupled to the WLAN for synchronization. It would be convenient, for example, if a PDA could be left in a brief case and synchronization would occur automatically. Or, another convenient mode of operation would be provide the user with the capability to trigger the synchronization from the PC. Further convenience would be realized if a mobile automotive media playback device permanently installed in a car could synchronize wirelessly when in range of the WLAN and when new content is available to be transferred, and likewise when a user triggered the synchronization at the PC. However, current hardware and software designs for portable or mobile automotive media playback devices require the devices to be constantly attached to the WLAN for the above-described automatic or user-triggered synchronization to occur.

A portable or mobile automotive device that is available on a wireless network for a substantially long period may require a significant portion of the electronics of the portable player device to be functioning. Although there are many digital wireless protocols, the 802.11 (802.11b, g, a) protocols have proliferated in the market and are very low in cost. Devices that use 802.11 WLAN transceivers typically use an operating system with a Transmission Control Protocol/Internet Protocol (TCP/IP) software stack, therefore the processor and operating system must be fully functional for the TCP/IP software to function. For example, a mobile automotive device incorporating an ARM7 microprocessor running Linux, and an 802.11b WLAN transceiver uses more than 200 milliamps when active on the network. For battery-powered devices, this amount of energy usage would drain the battery after a short while.

One solution for maintaining usable battery power in a portable player device would be to place the portable device in a docking/charging station. However, this is inconvenient for the user since they have to remember to place the portable device in the dock. And it would be expensive, if not cost prohibitive, to couple a mobile automotive media player to a constant source of AC power.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
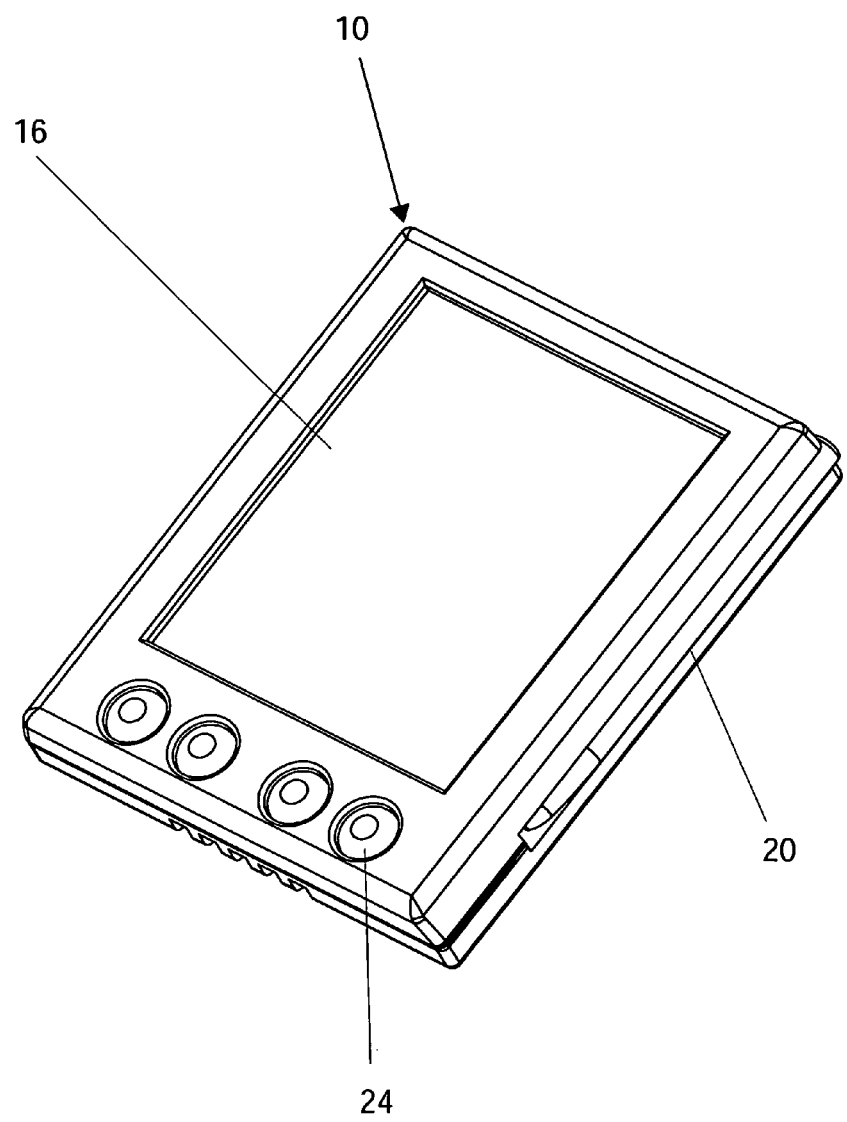
FIG. 1 is an isometric view of one embodiment of a portable media player device.

A system and method for activation of portable and mobile media player devices for wireless LAN services is described.

In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

In one embodiment, digital content synchronization of a portable or mobile automotive media playback device with a server computer is enabled automatically based on the availability of content, user specified synchronization times, or under the direct control of a user either at a server computer or when the user is within a predetermined signal range of the server computer and the portable or mobile automotive media playback device, without having the portable or mobile automotive media playback device to have communication established with a TCP/IP protocol network substantially constantly.

In one embodiment, automatic synchronization of content is provided to a portable device when new content is present at a server computer and the portable device is in range. Furthermore, the portable device may not have to be placed in a docking station in order to have the content synchronized with the server computer. In one embodiment, synchronization of a new content is performed automatically when the device is brought within a predetermined range of the server computer. A user may activate synchronization while the user is at the server computer. Alternatively, the user may activate synchronization using a key fob activator when the user and portable device are within a predetermined RF range of the server computer. In one embodiment, synchronization of the portable device in an automobile and the server computer is activated while conserving portable device or automobile battery power.

Some portions of the detailed descriptions which follow are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct more specialized apparatus to perform the processes. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

In one embodiment, a portable automotive media player device, which may also be referred to as a mobile device, periodically receives and stores content files and a content database from a server computer. The main computer subsystem in the portable device may be powered down or be put into a low power state. The portable device may further include a separate low power RF pulse receiver subsystem. This RF pulse receiver subsystem may be powered and ready to receive a pulse from an RF pulse transmitter independent of the main computer subsystem. In one embodiment, the RF pulse transmitter is functionally coupled to the server computer and/or included in a fob carried by a user. RF pulse as described in this disclosure is defined as a modulated radio-frequency data packet transmission including a device address, command, and error detection information. A system control software application running on a server computer automatically, or under the control of the user, may acquire new digital content from various sources, such as, for example, Internet servers.

In one embodiment, when new content has been acquired and is available at a server computer, the system control application triggers an RF pulse encoded for a predetermined portable device. If the portable device is within a predetermined range of the RF pulse, the RF pulse activates an RF pulse receiver circuit in the portable device, causing the portable device to power up and establish communication with the wireless network. The main computer system in the portable device may execute software instructions for content file transfers via the wireless network from the server computer. After the file transfer is complete, the main computer subsystem may be powered down until the next valid RF pulse transmission.

In another embodiment, the user may trigger an RF pulse using the RF pulse generator in a key fob when the user is within a predetermined RF range of the portable device. In response to the RF pulse, the portable device may power up, establish communication with the wireless network, and transfer content via the network from the server computer if the portable device is within the predetermined range of the server computer. Thus content may be transferred automatically, periodically, and/or under the direct control of the user.

Description of Hardware

Figure 2:
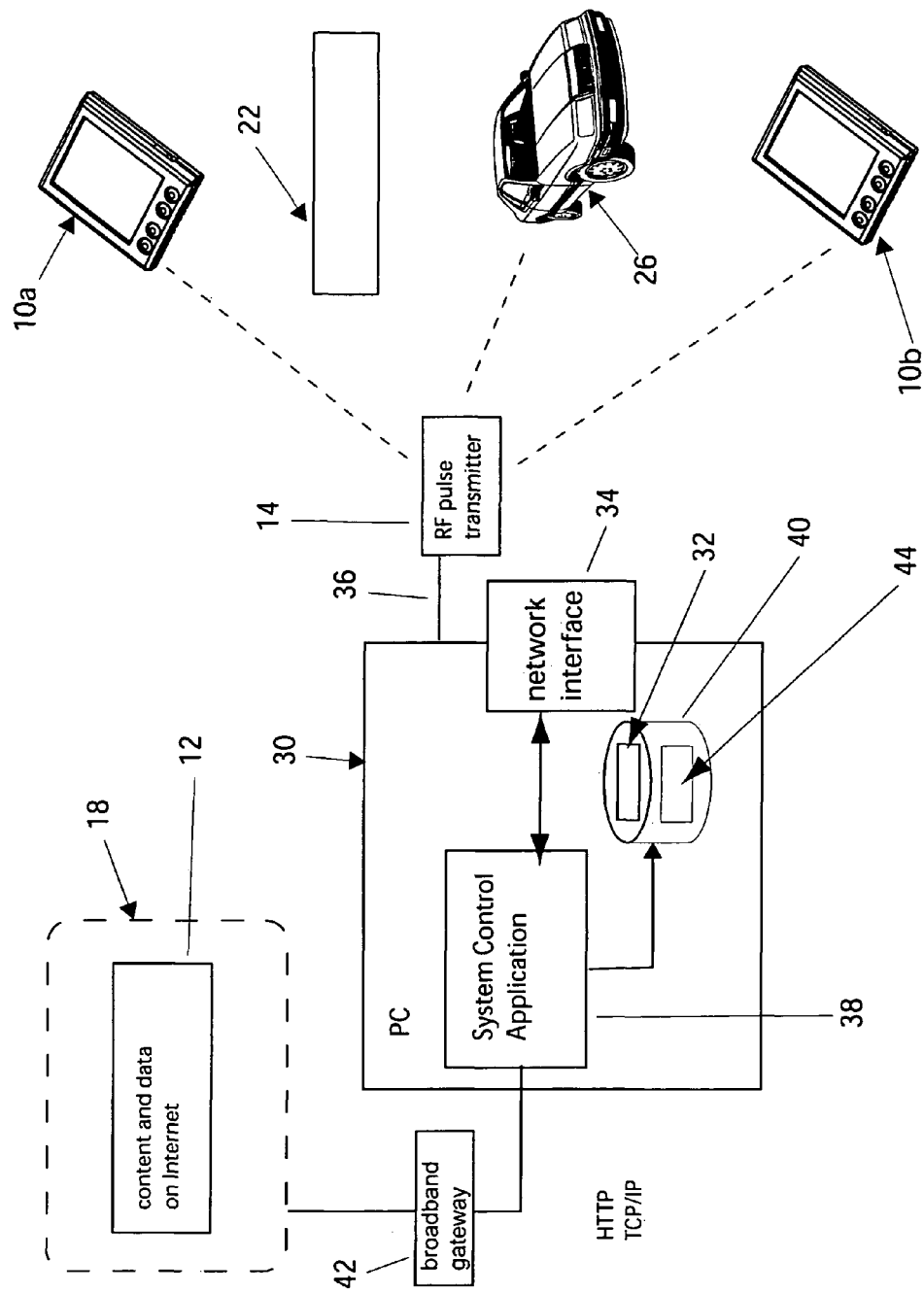
FIG. 2. shows one embodiment of a system for activation of portable media player devices for wireless LAN services.
Figure 3:
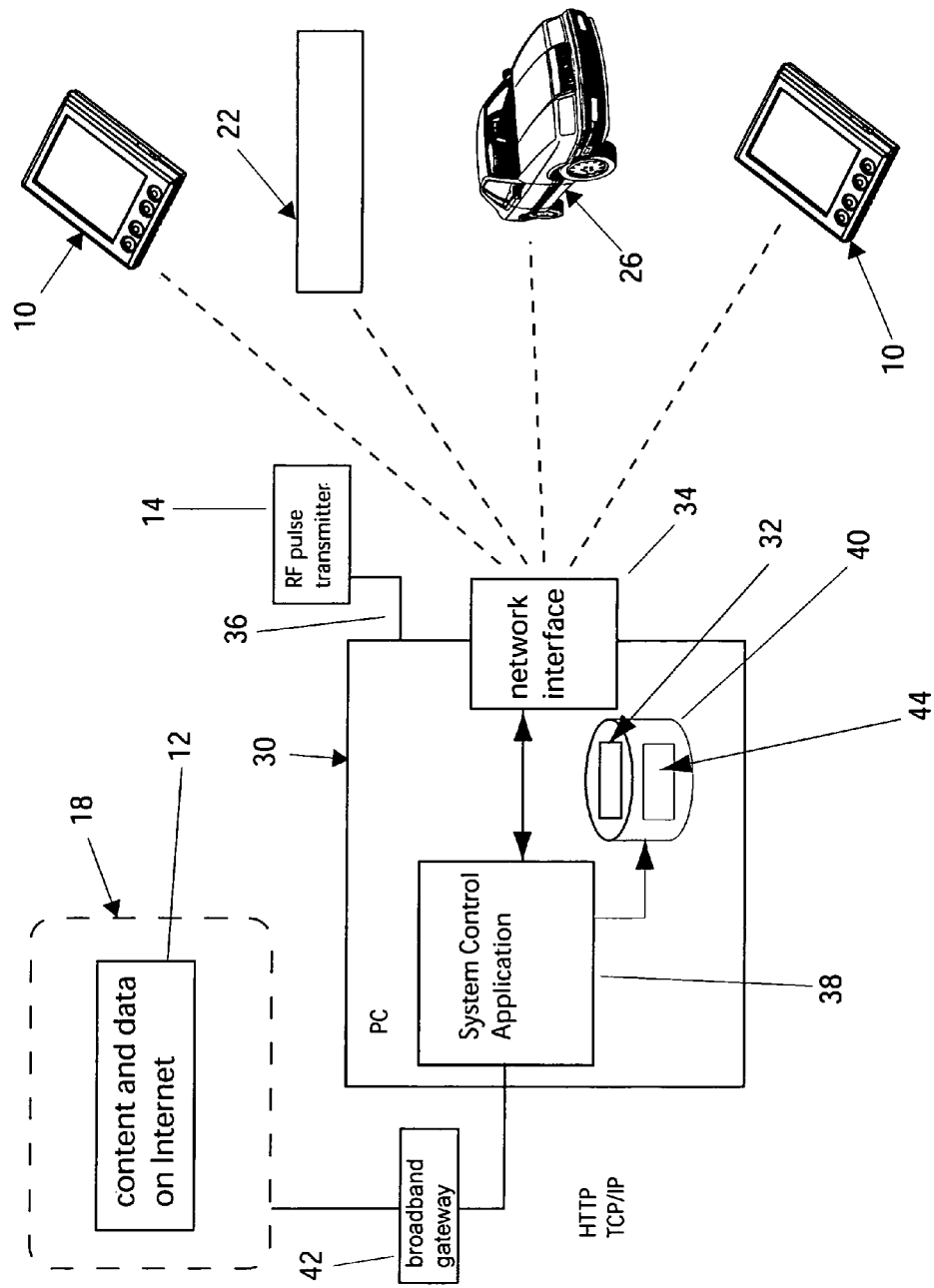
FIG. 3 shows one embodiment of a system for activation of portable media player devices for wireless LAN services.

FIG. 1 shows a portable media storage and playback device 10 that includes a touch sensitive liquid crystal display (LCD) 16, a stylus 20, and function buttons 24 for interacting with a user interface that controls an operating system and software applications. FIG. 2 is a system diagram that shows a server computer 30 that is a personal computer that includes a hard disk drive 40 for storing content files 44 in one embodiment. A server computer 30 may be coupled to the Internet 18 via a broadband 42 Internet connection. Functionally coupled to server computer 30 is an RF pulse transmitter 14 that can activate a variety of devices for establishing communication with a wireless network, such as the portable device 10a and 10b, and the mobile device 26. In one embodiment, the RF pulse transmitter 14 includes a USB port. In other embodiments, the server computer 30 can be a set-top box or a dedicated home media server, each with a broadband Internet connection 42. FIG. 3 is a system diagram showing that the server computer 30 is functionally coupled to a wireless LAN transceiver 34 to transfer digital content 44 to a variety of devices. A wired network, such as Ethernet, may couple the server 30 to a stationary device 22 for content 44 transfer if this physical layer is available. FIG. 2 and FIG. 3 show that the system may activate multiple portable media player devices. For example, the system may support multiple portable media storage and playback devices 10a and 10b and automobile-installed (mobile) media storage and playback devices 26. A unique RF pulse code may be provided for each of the multiple portable and mobile devices.

Figure 4:
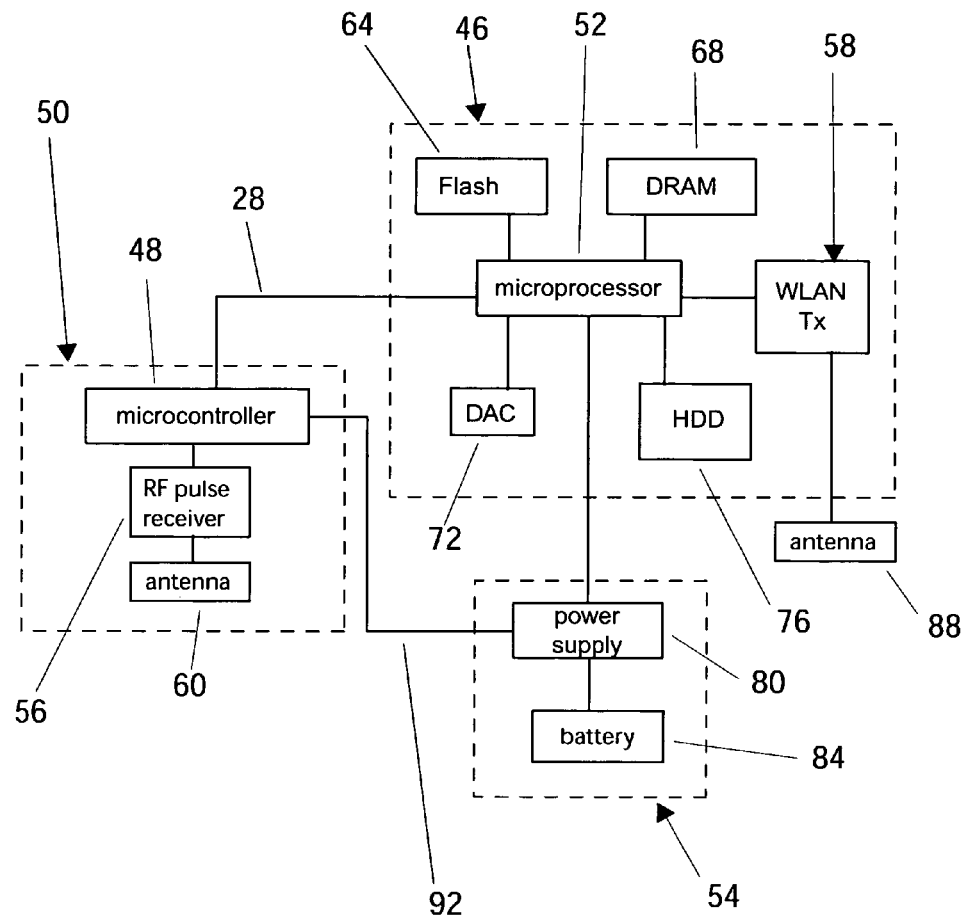
FIG. 4 shows one embodiment of a portable device.

FIG. 4 shows a hardware block diagram of one embodiment of a portable device 10 that includes a main computer subsystem 46, a low power RF pulse receiver computer subsystem 50, and a power supply subsystem 54 that includes a voltage regulator 80 and a battery 84. Main computer subsystem 46 includes a 1.8 inch hard disk drive 76, a microprocessor 52, a DRAM system memory 68, a flash memory 64, a digital-to-analog converter (DAC) 72, and a wireless local area network (LAN) transceiver 58. The microprocessor 52 may include a UART. The main computer system 46 may decode compressed audio files, such as MP3 files. In another embodiment, the portable device 10 may include one or more NAND flash memories as the mass memory storage medium. The WLAN transceiver 58 includes an 802.11b compliant transceiver. In other embodiments, the WLAN transceivers 58 operates according to alternative transmission formats, such as 802.11g or 802.11a. In one embodiment, the microprocessor 52 includes an EP7312 ARM microprocessor manufactured by Cirrus Logic of Austin, Tex. In an alternative embodiment, the main computer subsystem 46 includes a microprocessor and/or a digital signal processing (DSP) functional unit to decode a variety of content file formats, such as audio files (MP3, WMA, .wav), digital image files (JPEG, TIFF, etc.), and video files (MPEG-2, MPEG-4, WMV, etc.).

In one embodiment, the low power RF pulse receiver computer subsystem 50 includes a microcontroller 48 coupled to microprocessor 52 via a communication link 28 so that control signals may be sent between the microcontroller 48 and the microprocessor 52. The microcontroller 48 may include a microprocessor with an UART, a system memory, a number of programmable input/output ports, and an EPROM memory. In one embodiment, the aforementioned components reside on a single die. An RF pulse receiver circuit 56 is coupled to microcontroller 48 port. RF pulse receiver circuit includes the rfRXD0420 ASK receiver component, provided by Microchip of Chandler, Ariz. The communication link 28 may functionally couple the microcontroller 48 UART to the microprocessor 52 UART. In one embodiment, the communication link 28 uses RS-485 protocol. The programmable input/output port on the microcontroller 48 may be functionally coupled to the power supply subsystem 54 via a power enable link 92.

The microcontroller 48 may include a low cost PIC device, such as the PIC device made by Microchip Technology Inc., of Chandler, Ariz., which supports a low power mode. In one embodiment, the microcontroller 48 is programmed to power up at regular intervals to receive an RF pulse signal from the RF pulse receiver circuit 56 if an RF pulse transmission is sent from the RF pulse transmitter 14. The microcontroller 48 may also be functionally coupled to the power supply sub-system 54 to activate the microprocessor 52 by enabling power to the microprocessor 52 and/or related components.

An RF pulse receiver antenna 60, operable to receive RF pulses from the RF pulse transmitter 14 may be coupled to the RF pulse receiver circuit 56. The WLAN transceiver 58 may also include an antenna 88 used for 2.4 Ghz RF transmissions.

Referring to FIG. 2, the RF pulse transmitter 14 is coupled to the server computer 30 via a USB port 36. The RF pulse communications components, such as the components included in the RF pulse receiver 56 and the RF pulse transmitter 14, may be commonly found in remote keyless entry systems, such as car alarm systems. Transmitter devices such as these may be legally permitted to broadcast for brief periods of time under Federal Communication Commission (FCC) Part 15 regulations.

Description of Software—System Control Application

Figure 5:
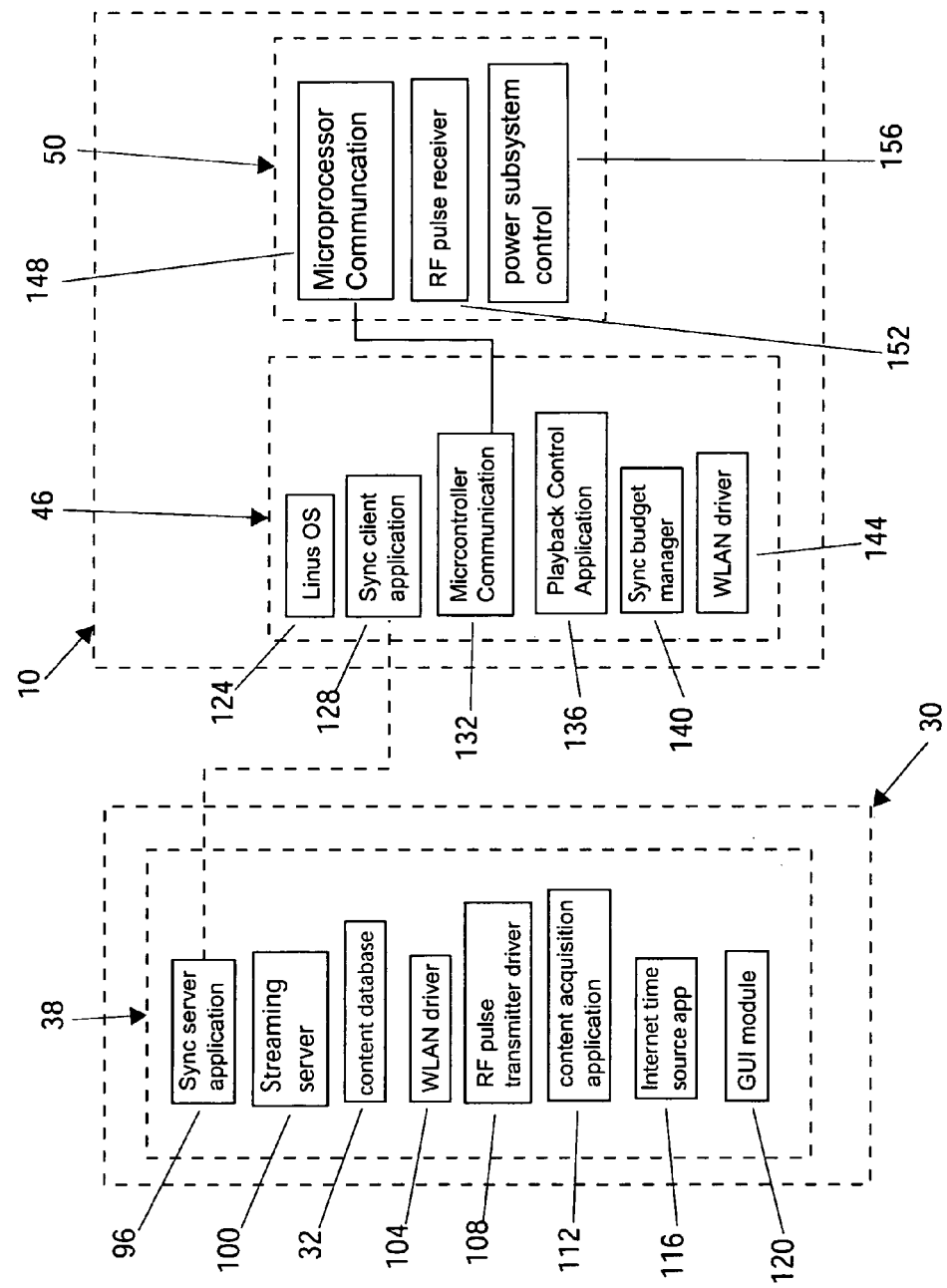
FIG. 5 shows one embodiment of the software components running on an exemplary server computer and an exemplary portable media player device.

Referring now to FIG. 5, a diagram shows software functions at server computer 30 and portable device 10. In one embodiment, system control application 38 includes a software application running on server computer 30. The system control application may include a number of sub-applications. The streaming service 100 provides communication, discovery, control logic, and streams via HTTP protocol to devices capable of receiving and decoding the associated digital media file streams, such as MP3 streams. Receiving and decoding streams is a service that is used by stationary device 22 and portable device 10 when portable device 10 is within range of the WLAN. The sync service application 96 may include communication, device discovery, scheduling of synchronization events, synchronization control, and logic for the transfer of digital media files 44 and other files via ftp to devices 10 and devices 26 with mass storage.

The content database 32 is a relational database that relates a variety of parameters (database columns) pertaining to digital media files 44 stored on the server 30, the hard disk drive 40, or addresses to streams or downloadable files 12 on the Internet 18 servers.

Figure 6:
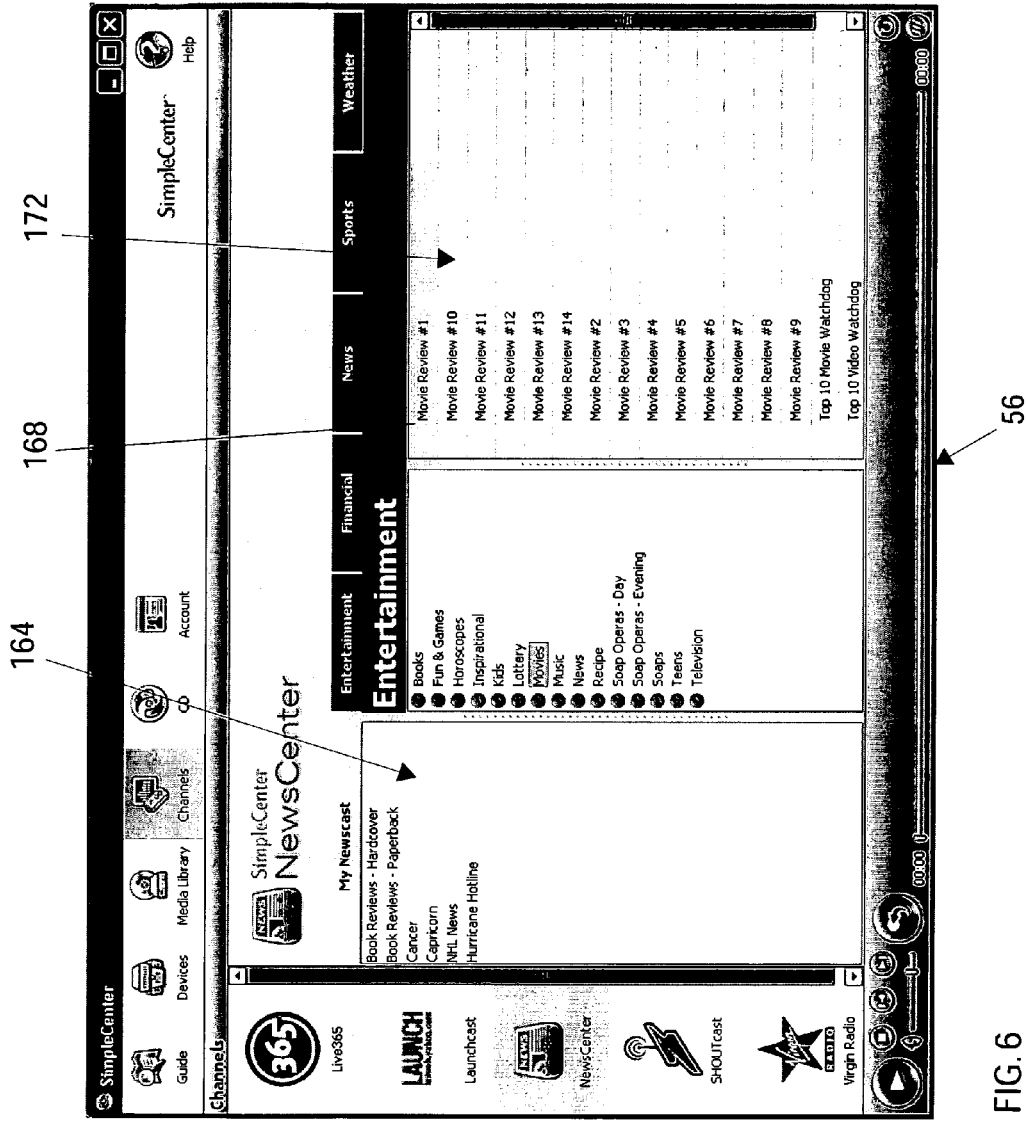
FIG. 6 shows one embodiment of a content selection graphical user interface.

The content acquisition application 112 automatically acquires content 12 from the Internet 18 servers based on various parameters, such as user selection, availability of an item, and content refreshment policies specific to each content 12 item or content 12 service. Referring now to FIG. 6, a content selection graphical user interface 56 is shown. A user may select a content item 168 of interest from the content items list 172 and drag the content item 168 over to the content selection list 164. Each content item 168 may be a graphical representation of a pointer to an audio file 12 on the Internet 18 server that is periodically updated. The update period policy value, a 24-hour time value, is provided by the content 12 provider. This policy value is stored in the content database 32 and is associated with the content item 168. Other data related to the update function may be stored in the content database 32, including the time and date of the last download, and the time and date that the content 44 was last synchronized with a specific device. For example, a news file 12 on Internet 18 server may be updated on an hourly basis. The content acquisition application 112 may manage the intelligent acquisition and caching of the Internet 18 content 12 for transference and/or synchronization with the viable portable 10 and the mobile player devices 26.

In one embodiment, the Internet time source application 116 is a service that acquires the latest correct time from the Internet 18 server to determine if the content 12 may be acquired from the Internet 18 server and to insure that the server computer 30 internal clock is accurate. For example, the Internet-based time source, such as the Network Time Protocol RFC-1305 (http://boulder.nist.gov/timefreq/service/its.htm), can be used as an accurate time source for the time-server service.

Figure 7:
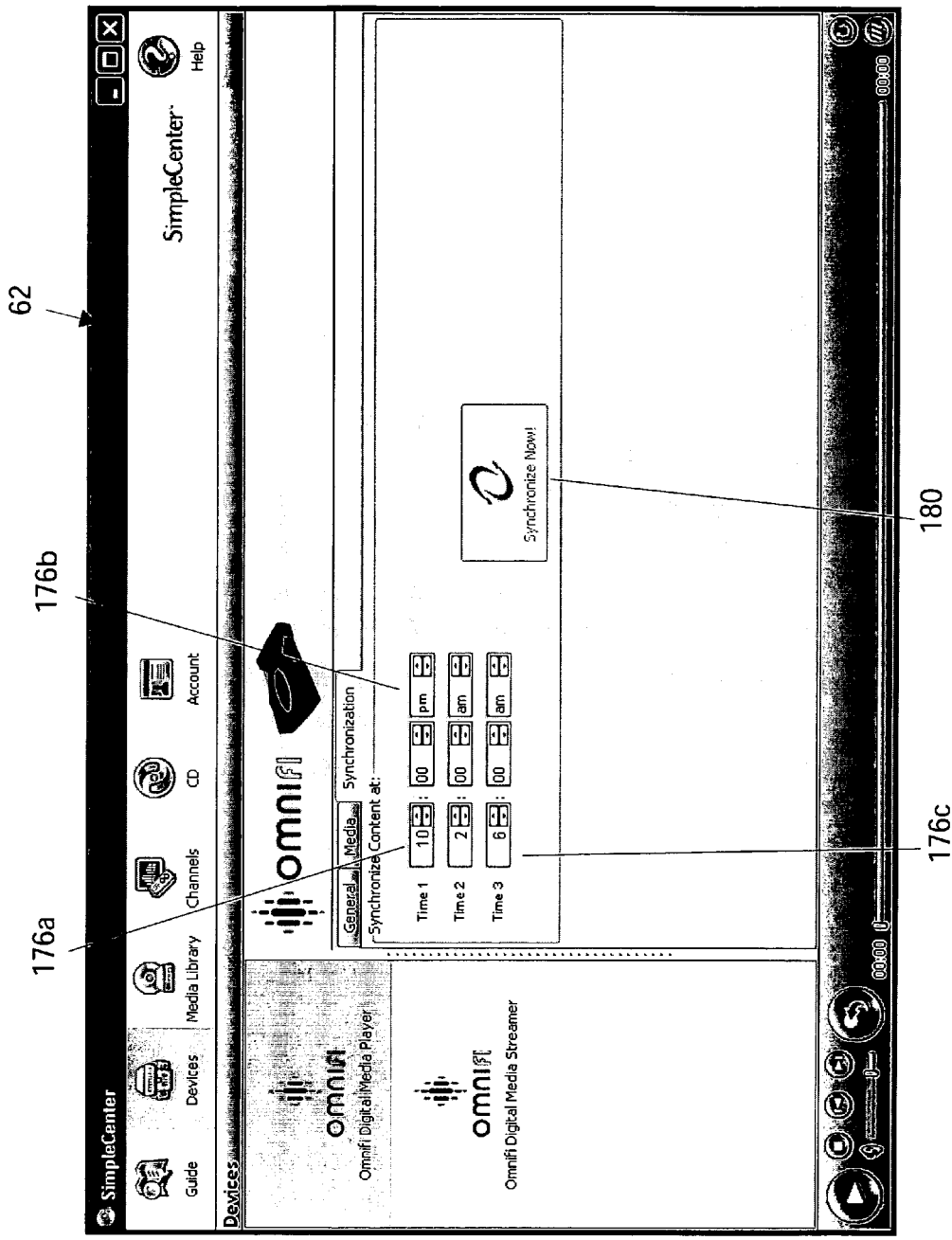
FIG. 7 shows one embodiment of a sync time settings graphical user interface.

In one embodiment, the graphical user interface (GUI) module 120 is the presentation layer application shown in FIG. 6 and FIG. 7. The GUI module 120 may functionally communicate with the set of functions contained in the system control application 38 to supply user inputs to the functions, to present system status and settings to the user, and to interact with and to modify the contents of the content database 32. For example, graphical user interface module 120 may include media management functions, such as the ability to make and edit playlists.

In one embodiment, the server computer 30 makes use of WLAN transceiver drivers 104 for delivering content to the portable device 10. The system control application 38 uses RF pulse transmitter USB driver 108 to activate the USB RF pulse transmitter 14 with the RF pulse code that corresponds to the portable device 10 or the mobile device 26 to which the content 44 is to be synchronized. The system control application 38 may include a listing that associates a unique RF pulse code for each portable device 10 or mobile device 26 that is allowed to receive the content 44 from the server computer 30.

Description of Software—Portable Device

In one embodiment, the portable device 10 includes a Linux operating system 124, which may be stored in flash memory 64, loaded into the DRAM system memory 68, and executed on the microprocessor 52, when the portable device 10 is powered on. FIG. 5 shows the software and/or firmware associated with the portable device 10.

The sync client application 128 may manage the discovery of and communication with the server 30, file transfer utilizing file transfer protocol from the server 30, and interface with the microcontroller 48 communication service 132. During synchronization, the content files 44 may be transferred from the server 30 to portable device 10. Microcontroller communication 132 includes the software service executing on the microprocessor 52 that handles communication with the microcontroller 48 via the RS-485 communication link 28.

In one embodiment, the playback control application 136 includes a set of software functions that enable the user control of the content files 44 stored on the hard disk drive 76, and the associated compression and decompression operations. The playback control 136 may include presentation layer elements as well as control logic.

In one embodiment, the sync budget manager 140 includes a set of software functions that determine the length of time that portable device 10 will execute content 44 synchronization with the server computer 30. Based on the length of time, the sync budget manager 140 may determine the amount of power from the battery 54 that portable device 10 may expend on synchronization. The sync budget manager 140 may operate based on one or more parameters, such as the amount of recharge time.

The microprocessor communication 148 function may handle communication between the microprocessor 52 and the microcontroller 48 over the RS-485 bus communication link 28. The microprocessor communication 148 may send a synchronization message to the microprocessor 52 when the RF pulse receiver subsystem 50 has been activated in response to an RF pulse from the server computer 30.

In one embodiment, the RF pulse receiver 152 software runs on the microcontroller 48 and monitors the output of the RF pulse receiver circuit 56. One embodiment of the RF pulse receiver 152 software is described in greater detail below.

The power subsystem control 156 may enable and/or disable the power supply subsystem 54 via the power enable link 92.

Description of Operation

In one embodiment, the main computer subsystem 46 in the portable device 10 powered down for the majority of the time. But the main computer subsystem 46 may be activated by the RF pulse receiver computer sub-system 50 to synchronize with the server 30. A scheduling function is an aspect of one embodiment of the sync server application 96. The sync server application 96 may activate the RF pulse transmitter 14, at a predetermined time designated by the user, for powering up the main computer sub-system 46 to synchronize content and data 44. The system control application 38 may include a user interface for setting a number of predetermined synchronization times.

FIG. 7 shows one embodiment of the sync settings graphical user interface (GUI) 62 of the system control application 38 running on the server computer 30. The sync settings graphical user interface 62 may include three synchronization time input fields and sync time setting fields 176*a, b*, and c. The sync server application 96 may send the time values entered in the sync time setting fields 176*a, b*, and c to a timer application, such as Windows OS timer service. Windows OS timer service may send a message to the sync server application 96 when the system time equals one of the sync time settings in the fields 176*a, b*, or c. When the sync server application 96 receives the response from Windows OS timer service, the sync server application 96 activates the RF pulse transmitter 14 to send an encoded message onto the airwaves. If the RF pulse receiver circuit 56 receives the encoded message, the encoded message may be interpreted by the RF pulse receiver firmware 152 on the microcontroller 48. The sync settings graphical user interface 62 may include a manual activation button 180 for the user to activate an immediate synchronization using the same process described herein. When the manual activation button 180 is selected, sync server application 96 causes the RF pulse transmitter 14 to send an RF pulse to a corresponding portable device 10 or mobile device 26 according to an RF pulse code. In one embodiment, the RF pulse code is encrypted by the RF pulse transmitter driver 108, and decrypted by the RF pulse receiver subsystem 50. The encryption and decryption may use public key/private key encryption technology.

Figure 8:
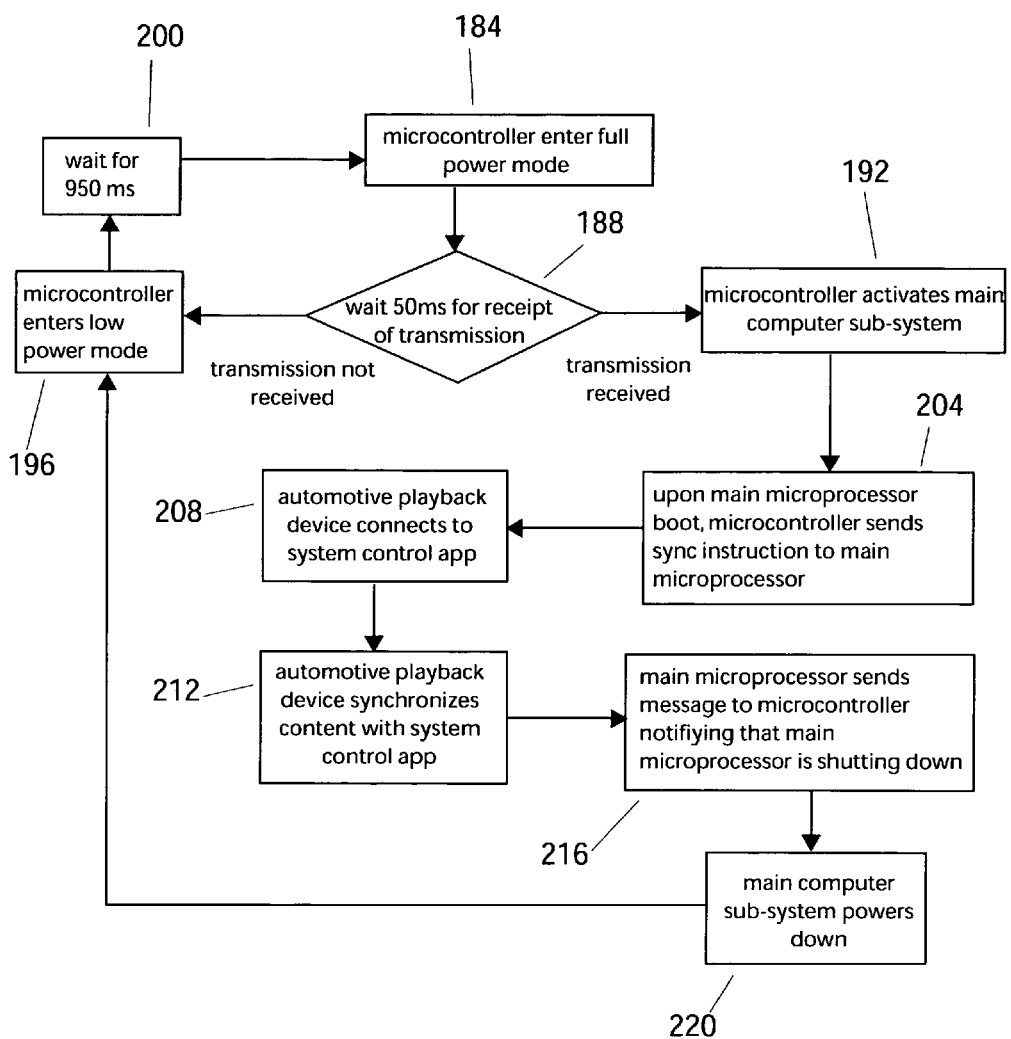
FIG. 8 is a flow chart of one embodiment of a process to automatically synchronize the content of a portable device with a server computer.

FIG. 8 is a flow chart showing one embodiment of a process by which the RF pulse triggered synchronization occurs. The microcontroller 48 may be programmed to continuously cycle between a full power mode and a low power mode. In one embodiment, the microcontroller 48 enters full power mode (processing block 184). Microcontroller 48 and related components (e.g., power supply 54) may use approximately 15 mA of power. In state 196 low power mode, microcontroller 48 and related sub-system components may use approximately 10 μA of power.

Figure 9:
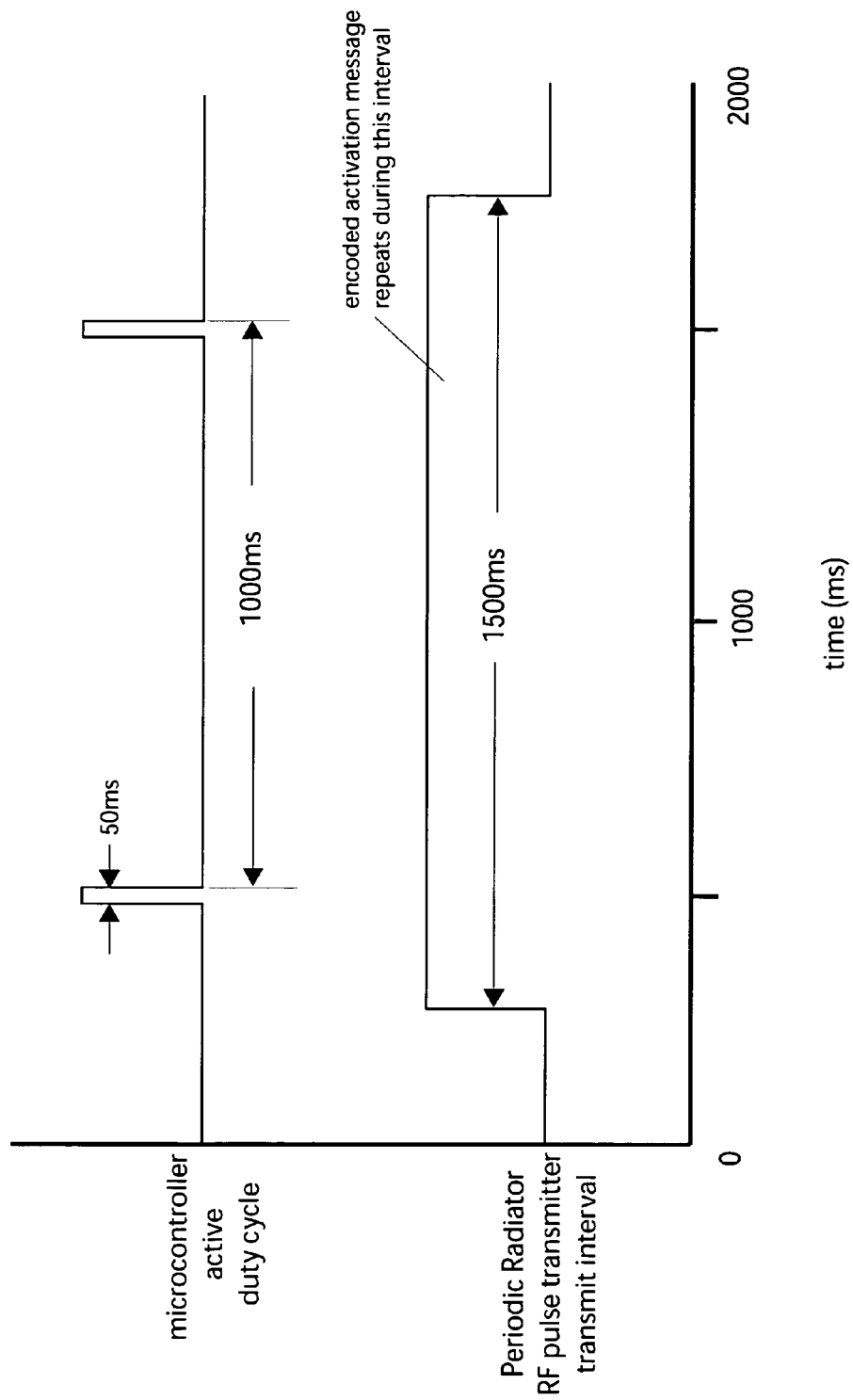
FIG. 9 is a graph of the operational duty cycles of an exemplary RF pulse transmitter and RF pulse receiver subsystem.

FIG. 9 is a graph of a duty cycle that shows that microcontroller 48 is in full power mode 5% of the time. This duty cycle provides for low total power usage by portable device 10 when portable device 10 is not being operated. In low power mode, microcontroller 48 is simply counting time and monitoring other inputs, until it changes to full power mode.

Referring again to FIG. 8, while in full power mode, the microcontroller 48 waits to receive an RF pulse message on a port that is coupled to the RF pulse receiver circuit 56, shown in FIG. 4 (the processing block 188). When the system control application 38 receives a message from Windows OS timer service, the system control application 38 activates RF pulse transmitter 14 by sending an activation message to the RF pulse transmitter PC driver 108, which activates the RF pulse transmitter 14 hardware.

When RF pulse transmission is received, the microcontroller 48 enables the power supply subsystem 54 to provide power to the microprocessor 52 and the main computer subsystem 46 (processing block 192). After microprocessor 52 is booted, the microcontroller 48 may send a message via the communication link 28 to the microprocessor 52 (processing block 204) instructing the microprocessor 52 to activate the wireless LAN transceiver 58 and to establish communication with the system control application 38 on the server computer 30 to synchronize content and data 44 (processing block 208). The portable device 10 synchronizes content with the system control application 38 (processing block 210). After synchronization is complete, the microprocessor 52 may send a message to the microcontroller 48 (processing block 216) informing the microcontroller 48 that the microprocessor 52 and the main computer subsystem 46 is powering down (processing block 220). The microcontroller 48 then enters low power mode (processing block 196) and waits for 950 milliseconds (processing block 200) before resuming the power mode cycle. If an RF pulse is transmitted by the server computer 30 and there is no response from portable device 10 after a predetermined time interval (for example, after 2 minutes), the RF pulse is transmitted again until the corresponding portable device 10 or mobile device 26 responds and synchronization of content 44 is executed. In one embodiment, the RF pulse is transmitted every 5 minutes until there is a response.

Figure 10:
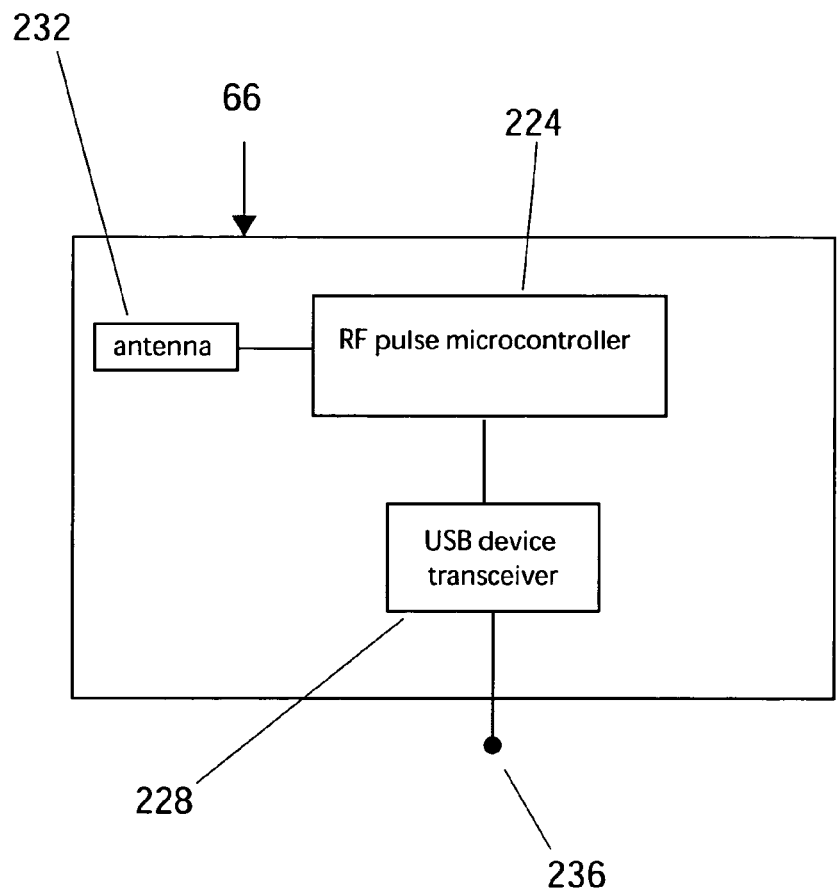
FIG. 10 shows one embodiment of a USB RF pulse transmitter.

FIG. 10 shows a block diagram of one embodiment of the RF pulse transmitter 14. In one embodiment, the RF pulse transmitter 14 is a USB device that includes an 8-bit RF pulse microcontroller 224, such as the RFPIC12C509AG microcontroller, manufactured by Microchip Technology, Inc. of Chandler, Ariz., and includes an RF transmitter functional unit. A USB device transceiver chip 228 may be functionally coupled to the RF pulse microcontroller 224 to enable the device to be coupled to the USB port of the server computer 30 and to provide power to the RF pulse transmitter 14. The RF pulse microcontroller 224 may also include an antenna 232.

Referring again to FIG. 9, the timing of the microcontroller 48 low power/full power duty cycle is approximately 5%, that is, the microcontroller 48 is powered up and able to receive the RF pulse transmission for approximately 50 ms out of every one second. FIG. 9 also shows that the system control application 38 may repeatedly activate the RF pulse transmitter 14 for a total of about 1.5 seconds. During this time, the encoded message carried by the RF pulse may be repeated approximately 100 times and therefore, the length of the actual encoded message is approximately 15 milliseconds. Since, the encoded activation message is repeated over a substantially longer period than the inactive (low power) period of the microcontroller 48, the microcontroller 48 may become active to receive the encoded message during some part of the RF pulse activation message interval.

Alternative Embodiment—Wide Area Network

In another embodiment, the RF pulse transmission system can be implemented using a Wide Area Network pager system. A pager network receiver may be coupled to the microcontroller 48, in place of, or in addition to, the RF pulse receiver circuit 56. The system control application 38 on the server 30 includes a link to the Internet 18. The system control application 38 may send an XML message using HTTP to a server on the Internet. The server may re-package the message for broadcasting on the pager network. To trigger synchronization, a pager message with the specific pager serial number of the associated pager receiver in the portable device 10 is sent and the message is broadcast. The pager receiver in the car receives the message and activation of the microprocessor 52 follows as described herein. The Wide Area Network approach can also be implemented using the mobile cellular phone network. A mobile cellular phone transceiver integral to the automobile includes an input into the microcontroller 48 for triggering a low power subsystem, which in turn activates the main computer subsystem 46.

In another embodiment, the automobile includes a GPS system that provides location information via the mobile cellular connection to the server computer. This information is used to determine if content synchronization is possible, i.e., whether the mobile automotive media player device is within range of a viable WLAN.

Alternative Embodiment—Microprocessor with Low Power Mode

In another embodiment, the portable device includes a microprocessor operable at a clock speed lower than a standard operating clock speed (required for media decoding) to conserver power. The microprocessor may shut down various subsystems, such as the USB port, the internal registers, and/or other input/output subsystems. In one embodiment, the internal registers that receive the activation signal from the RF pulse receiver circuit are active. The portable device may not include a miconcontroller.

Alternative Embodiment—Mobile Automotive Application

Figure 11:
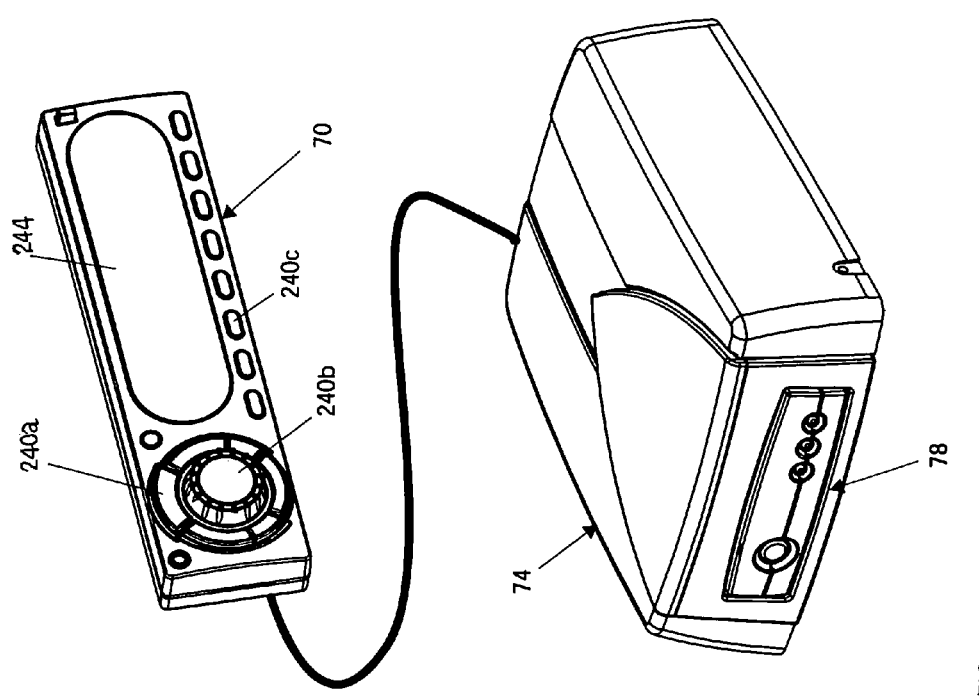
FIG. 11 shows one embodiment of a mobile automotive media playback device.
Figure 12:
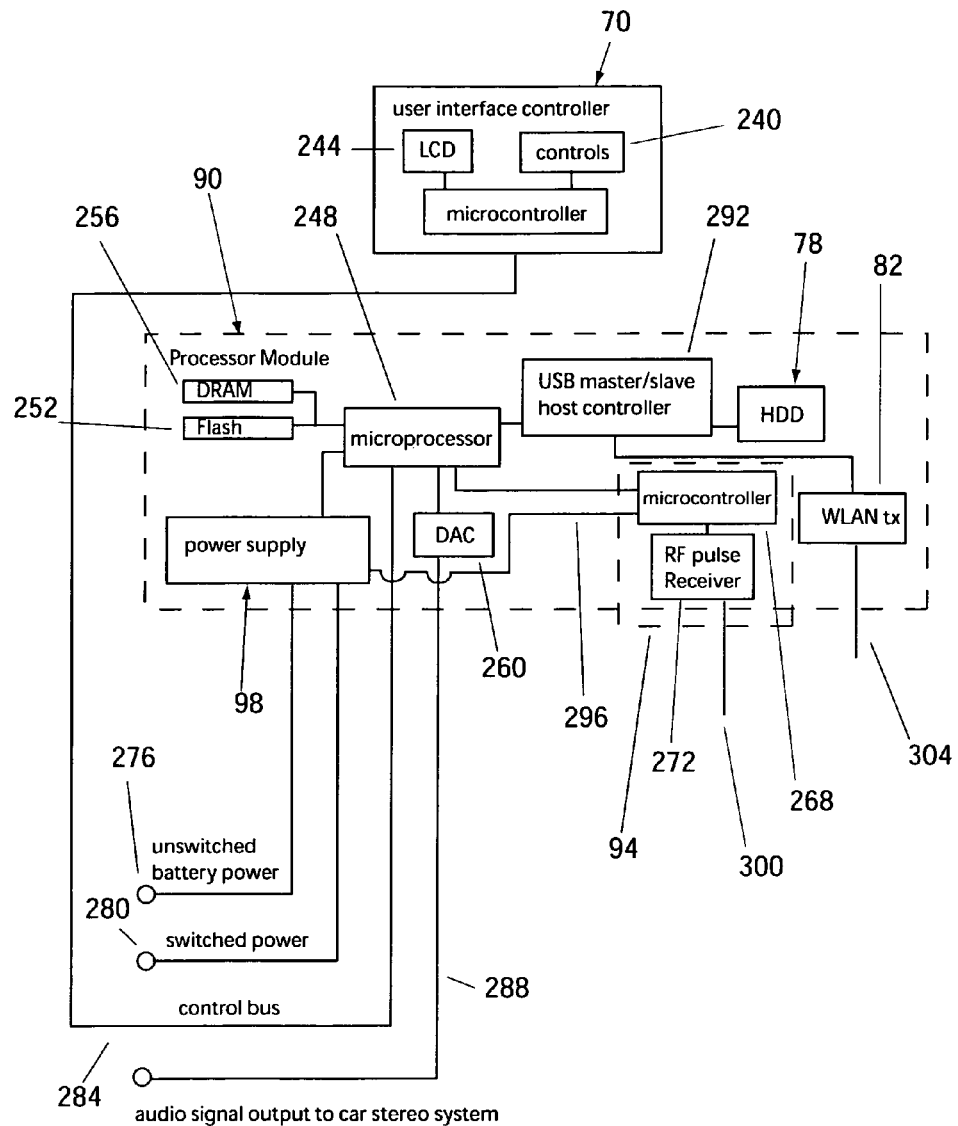
FIG. 12 shows one embodiment of a mobile automotive media playback device in an exemplary automobile.

Referring now to FIG. 11 and FIG. 12, one embodiment of a mobile automotive playback device 26 that can be installed in an automobile is shown. A processor module 74 includes the main computer subsystem 90 and a low power RF pulse receiver subsystem 94, as well as a removable hard disk drive cartridge 78 on which the content 44 is stored. A user interface controller 50 is coupled to processor module 74 via a 485-bus communication link 284 and includes a backlit liquid-crystal display 52 and a plurality of buttons 240 that allow the user to control playback. In one embodiment, placement of the mobile playback device 26 into an automobile is schematically similar to systems incorporating multi-CD changers that are typically located in the trunk. Processor module 74 may be located in the trunk or underneath a seat, and controller 70 should be located in a DIN-shaped slot or may be surface mounted within the reach of the driver or passengers. FIG. 12 shows that power supply subsystem 98 is coupled to the car battery so that power is supplied to mobile automotive media player device 26 when the car ignition is turned off.

FIG. 2 shows one embodiment of the mobile automotive media player 26 operable to receive content 44 from the server computer 30 as shown in the preferred embodiment. In one embodiment, the mobile automotive media player 26 is integrated into an automobile with an existing conventional car stereo.

Referring now to FIG. 12, the processor module 74 includes a microprocessor 248, flash memory 252, dynamic random access memory (DRAM) 256, a power supply subsystem 98, a digital-to-analog converter (DAC) 260, a USB host controller 292, and a 20 gigabyte hard disk drive cartridge 78. A USB 802.11b wireless LAN transceiver 82 is coupled to processor module 74 via a USB port.

In one embodiment, the output of DAC 260 is plugged into line level inputs 288 in the existing car stereo system head unit. The DAC 260 may convert decompressed digital audio to an analog signal at line levels. In one embodiment, the existing car stereo system provides the ability to switch to an auxiliary source. In another embodiment, the analog audio signal that is output from processor module 74 is input into the automobile audio system by being plugged into an FM antenna tap. The analog output from DAC 260 is modulated by an FM modulator. This type of connection into existing car stereos may be found in after-market CD changer installations.

Alternative Embodiment—Integrated Head Unit

In an alternative embodiment, the control interface is integrated into the head unit, which may be installed in the automobile at a factory. The processor module 74 is installed in a different location, such as underneath a seat or in the trunk.

In another embodiment, the processor module 74 includes the main computer subsystem 90. The factory head unit enclosure includes the low power RF pulse receiver subsystem 94, which is located in the dash. In one embodiment, the factory head unit includes a Compact Flash slot into which a Compact Flash wireless LAN card may be inserted to provide wireless access. In another embodiment, the wireless LAN transceiver may be located elsewhere, such as in the headliner of the car, and may be functionally coupled to the main computer subsystem via a USB port.

The mass storage memory for mobile automotive media player may include flash memories. In one embodiment, all the flash memories are non-removable. Alternatively, some of the flash memories are removable. Alternatively, all partially removable, or totally removable.

In an alternative embodiment, a mobile automotive media player is provided that can support transfer and presentation of video content such as MPEG-2 or MPEG-4 video files. The video content may be downloaded to the mobile automobile media player where the video content maybe decoded and displayed. In one embodiment, the mobile automobile media player includes a high-resolution graphics LCD. Furthermore, the user can receive information, such as driving directions, maps, or movies, using the mobile automobile media player.

Alternative Embodiment—RF Wakeup Subsystem in Key Fob

Figure 13:
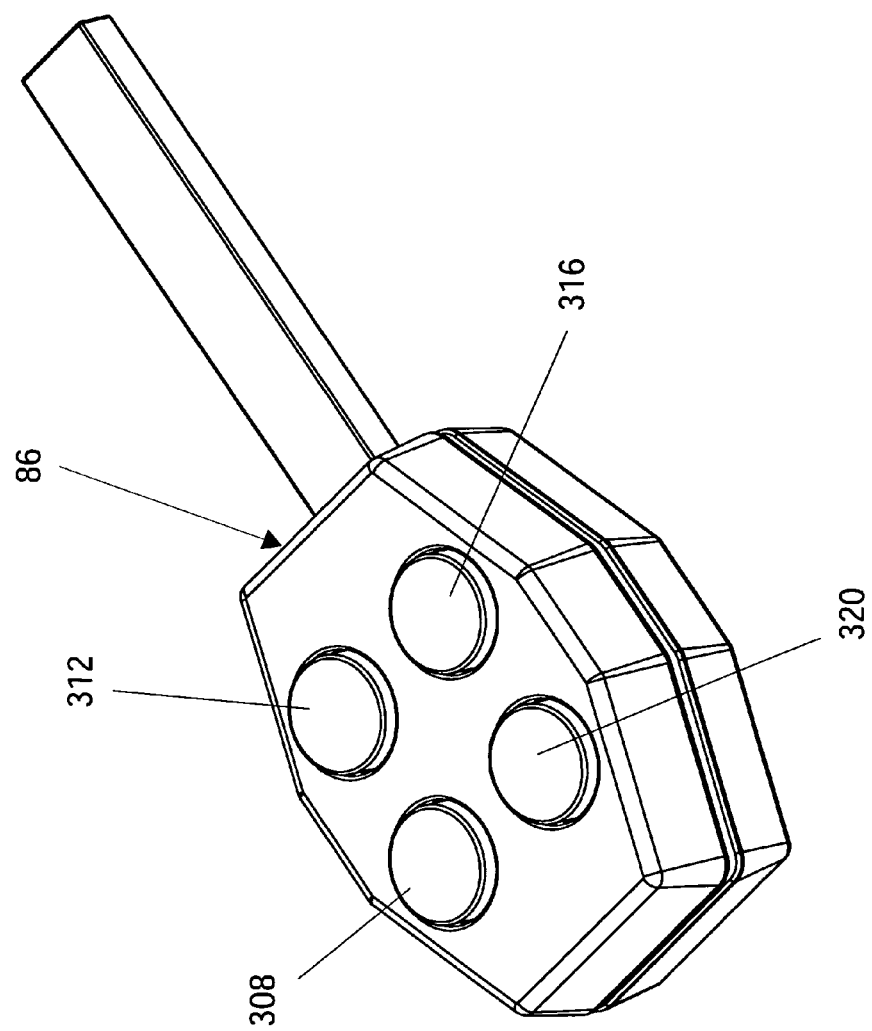
FIG. 13 shows one embodiment of a key fob.

In some embodiments, the RF communication subsystem described above may be triggered by an RF pulse from a key fob. The key fob may include electronic circuitries and a power supply (e.g., a battery). Furthermore, the key fobs may be used with car alarms or keyless entry systems. FIG. 13 shows one embodiment of an RF pulse key fob 86 with an RF pulse transmitter. The key fob 86 may include a emergency mode button 308, a lock/unlock button 312, and a trunk open button 316. The key fob 86 may further include a button 320 for triggering wireless synchronization 320. In one embodiment, the RF pulse transmitter produces an RF pulse that includes the RF pulse message. When the RF pulse receiver subsystem 94 receives the pulse, synchronization may be triggered as described above. Alternatively, the RF pulse transmitter may be implemented in a car alarm remote/keyless remote entry control housing that does not include a car key.

The invention claimed is:

1. A system comprising:
   a server computer having an associated wireless transmitter, wherein the server computer is programmed to:
      receive, from a user interface, a predetermined future time selected by a user at which an automatic process of content synchronization is to be initiated; and
      cause the wireless transmitter to transmit a signal to initiate the automatic process of content synchronization with a portable device at the predetermined future time, wherein the signal is caused to be transmitted by the server computer without regard to the portable device being within a range to receive the signal;
   wherein the portable device comprises:
      a wireless receiver subsystem comprising a wireless receiver and a first antenna associated with the wireless receiver;
      a wireless transceiver subsystem in communication with the wireless receiver subsystem, the wireless transceiver subsystem comprising a wireless transceiver and a second antenna associated with the wireless transceiver;
      wherein the wireless receiver subsystem is configured to:
         continuously and automatically cycle between a first power mode and a second power mode at least until the signal is received by the wireless receiver; and
         respond to the signal when received by the wireless receiver to cause the wireless transceiver subsystem to transition from a standby state to an active state in which the wireless transceiver subsystem uses the wireless transceiver to actively perform content synchronization with the server computer and wherein the wireless transceiver subsystem consumes less power in the standby state than in the active state; and
      a synchronization budget manager which limits time during which the wireless transceiver subsystem of the portable device is in the active state as a function of an amount of power which is allowed to be expended on content synchronization, wherein the amount of power which is to be expended on content synchronization is determined based on an amount of time to recharge a battery.

2. The system of claim 1, wherein the wireless transmitter is physically coupled to the server computer.

3. The system of claim 1, wherein the server computer causes the wireless transmitter to transmit the signal periodically until the portable device responds to the signal.

4. The system of claim 1, wherein the wireless receiver includes a radio frequency (RF) receiver and the wireless transmitter includes a RF transmitter.

5. The system of claim 1, wherein the wireless receiver includes a pager network receiver.

6. The system of claim 1, wherein the wireless receiver includes a mobile cellular phone network receiver.

7. The system of claim 1, wherein the wireless transceiver includes a wireless local area network (WLAN) transceiver.

8. The system of claim 1, wherein the server computer includes a personal computer.

9. An apparatus comprising:
   a wireless receiver subsystem comprising a wireless receiver and a first antenna associated with the wireless receiver;

a wireless transceiver subsystem in communication with the wireless receiver subsystem, the wireless subsystem comprising a wireless transceiver and a second antenna associated with the wireless transceiver;

wherein the wireless receiver subsystem is configured to:
continuously and automatically cycle between a first power mode and a second power mode at least until a signal is received by the wireless receiver; and
respond to the signal received by the wireless receiver to cause the wireless transceiver subsystem to transition from a standby state to an active state during which the wireless transceiver subsystem uses the wireless transceiver to perform content synchronization with a server computer, and wherein the wireless transceiver subsystem consumes less power in the standby state than in the active state, wherein the synchronization of the content is performed at a predetermined time specified by a user in response to a command from the server computer; and a synchronization budget manager which limits time during which the wireless transceiver subsystem is in the active state as a function of an amount of power which is allowed to be expended on content synchronization, wherein the amount of power which is to be expended on content synchronization is determined based on an amount of time to recharge a battery.

10. The apparatus of claim 9, wherein the wireless receiver subsystem comprises a microprocessor, coupled to the wireless receiver, to periodically enable the wireless receiver.

11. The apparatus of claim 10, wherein the microprocessor consumes less power in the first power mode than in the second power mode, and the microprocessor enables the wireless receiver when the microprocessor is in the second power mode.

12. The apparatus of claim 10, wherein the wireless transceiver subsystem comprises a microprocessor to enable the wireless transceiver in response to the signal; and a power supply system, coupled to the microprocessor of the wireless transceiver subsystem, to provide power to the microprocessor of the wireless transceiver subsystem.

13. The apparatus of claim 12, wherein the microprocessor of the wireless receiver subsystem causes the power supply system to provide power to the microprocessor of the wireless transceiver subsystem in response to receipt of the signal.

14. A method comprising:
continuously and automatically cycling a wireless receiver subsystem of a portable device between a first power mode and a second power mode at least until a wireless signal is received by a wireless receiver of the wireless receiver subsystem;
receiving the wireless signal at a first antenna of the wireless receiver subsystem of the portable device;
using receipt of the wireless signal by the wireless receiver subsystem of the portable device to cause the wireless receiver subsystem of the portable device to transition a wireless transceiver subsystem of the portable device from a standby state to an active state wherein the wireless transceiver subsystem of the portable device consumes more power in the active state than in the standby state;
causing the wireless transceiver subsystem of the portable device to use a wireless transceiver to synchronize content stored in the portable device with content in a server computer via a second antenna associated with the wireless transceiver in response to the wireless transceiver subsystem of the portable device being transitioned by the wireless receiver subsystem of the portable device to the active state, wherein the synchronization of the content is performed at a predetermined time specified by a user in response to a command from the server computer; and limiting time during which the wireless transceiver subsystem of the portable device is in the active state as a function of an amount of power which is allowed to be expended on content synchronization, wherein the amount of power which is to be expended on content synchronization is determined based on an amount of time to recharge a battery.

15. The method of claim 14, further comprising using the wireless receiver system of the portable device to enable a power supply system subsystem of the portable device to thereby cause the wireless transceiver subsystem of the portable device to transition from the standby state to the active state.

16. The method of claim 15, wherein the wireless receiver subsystem of the portable device is operable in the second power mode to enable the power supply system subsystem of the portable device in response to the wireless signal, and wherein the wireless receiver subsystem of the portable device consumes less power in the first power mode than in the second power mode.

17. The method of claim 14, wherein the wireless signal includes a radio frequency (RF) pulse.

18. The method of claim 14, wherein the wireless signal includes a pager message.

19. The method of claim 14, further comprising decoding an encrypted message carried by the wireless signal.

20. An apparatus comprising:
means for continuously and automatically cycling a wireless receiver subsystem of a portable device between a first power mode and a second power mode at least until a wireless signal is received by a wireless receiver of the wireless receiver subsystem;
means for receiving the wireless signal at a first antenna of the wireless receiver subsystem of the portable device;
means for transitioning a wireless transceiver subsystem of the portable device from a standby state to an active state wherein the wireless transceiver subsystem of the portable device consumes more power in the active state than in the standby state;
means for synchronizing content stored in the portable device with content in a server computer via a second antenna associated with the wireless transceiver subsystem in response to the wireless transceiver subsystem of the portable device being transitioned by the wireless receiver subsystem of the portable device to the active state, wherein the synchronization of the content is performed at a predetermined time specified by a user in response to a command from the server computer; and
means for limiting time during which the wireless transceiver subsystem of the portable device is in the active state as a function of an amount of power which is allowed to be expended on content synchronization, wherein the amount of power which is to be expended on content synchronization is determined based on an amount of time to recharge a battery.

21. The apparatus of claim 20, wherein the wireless signal includes a radio frequency (RF) pulse.

22. The apparatus of claim 20, wherein the wireless signal includes a pager message.

23. The apparatus of claim 20, further comprising decoding an encrypted message carried by the wireless signal.

24. The system of claim 1, wherein the server computer further comprises a user interface configured to receive and set a plurality of predetermined synchronization times.

25. The system of claim 24, wherein the server computer is further configured to receive and store a plurality of predetermined synchronization times from the user interface.

26. The system of claim 1, wherein the wireless receiver subsystem is further configured to determine the amount of power which is allowed to be expended on content synchronization.

* * * * *